US 6,337,761 B1

(12) United States Patent
Rogers et al.

(10) Patent No.: US 6,337,761 B1
(45) Date of Patent: Jan. 8, 2002

(54) ELECTROPHORETIC DISPLAY AND METHOD OF MAKING THE SAME

(75) Inventors: John A. Rogers, New Providence; Pierre Wiltzius, Millington, both of NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/409,631

(22) Filed: Oct. 1, 1999

(51) Int. Cl.$^7$ ................................ G02B 26/00
(52) U.S. Cl. ........................ 359/296; 345/107
(58) Field of Search ............ 345/107; 359/296

(56) References Cited

U.S. PATENT DOCUMENTS

| 4,203,106 A | 5/1980 | Dalisa et al. ............ 345/107 |
| 4,655,897 A | 4/1987 | DiSanto ................ 359/296 |
| 4,680,103 A | 7/1987 | Beilen .................. 359/296 |
| 4,891,245 A | 1/1990 | Micale ................. 427/213.3 |
| 5,276,438 A * | 1/1994 | DiSanto et al. .......... 345/107 |
| 5,403,518 A | 4/1995 | Schubert ............... 252/572 |
| 5,699,097 A * | 12/1997 | Takayama et al. ........ 347/171 |
| 5,872,552 A | 2/1999 | Gordon et al. ........... 345/107 |

FOREIGN PATENT DOCUMENTS

| WO | WO 98/03896 | 1/1998 |
| WO | WO 98/41898 | 9/1998 |
| WO | WO 98/41899 | 9/1998 |
| WO | WO 99/10769 | 3/1999 |

OTHER PUBLICATIONS

Murau, P.; "Characteristics of an X–Y Addressed Electrophoretic Image Display (EPID)"; *SID Digest*; Dated: 1984; p. 141.

Murau, et al.; "The Understanding and Elimination of Some Suspension Instabilities in an Electrophoretic Display"; *American Institute of Physics* vol. 49(9); Dated: Sep. 1978; pp. 4820–4829.

Beilin, et al.; "2000–Character Electrophoretic Display" *SID Digest*; Dated 1986; pp. 136–140.

Kornfeld, Cary; "A Defect–Tolerant Active–Matrix Electrophorelic Display" *SID Digest*; Dated: 1984; pp. 142–143.

Cominskey, et al.; "An Electrophoretic Ink For All–Painted Reflective Electronic Displays" Nature; Dated: Jul. 16, 1998; pp. 253–255,.

Drzaic, et al.; "A Printed and Rollable Distable Electronic Display"; *SID Digest*; Dated: 1998;.

Ota, et al.; "Electrophoretic Image Display (EPID) Panel"; Dated: Feb. 7, 1973; pp. 832–836.

Fitzhenry–Ritz, Beverly; "Optical Properties of Electrophoretic Image Displays"; *IEEE Transactions on Electron Devices*; vol. ED–28, No. 6; Dated: Jun. 1981; pp. 726–735.

Jacobson, et al.; "The Last Book"; *IBM Systems Journal*; vol. 36, No. 3; Dated: 1997; pp. 457–463.

Dalisa, Andrew L., "Electrophoretic Display Technology", IEEE Transactions On Electron Devices, Jul. 1977, pp. 827–834.#jf139##

*Primary Examiner*—Evelyn A Lester
(74) *Attorney, Agent, or Firm*—Lowenstein Sandler PC

(57) ABSTRACT

A configuration for an electrophoretic display device is described that is effective in substantially preventing agglomeration of pigment particles. A suspension medium is contained between first and second electrodes to define an electrophoretic display cell; a plurality of pigment particles are dispersed in the suspension medium and a plurality of mechanical members project therein. The members advantageously are sized sufficiently small such that a plurality of members can exist within a minimally visible region of the cell. The mechanical members may be fabricated separately from the remaining parts of the display, allowing for flexibility in the fabrication materials and processing conditions.

10 Claims, 5 Drawing Sheets

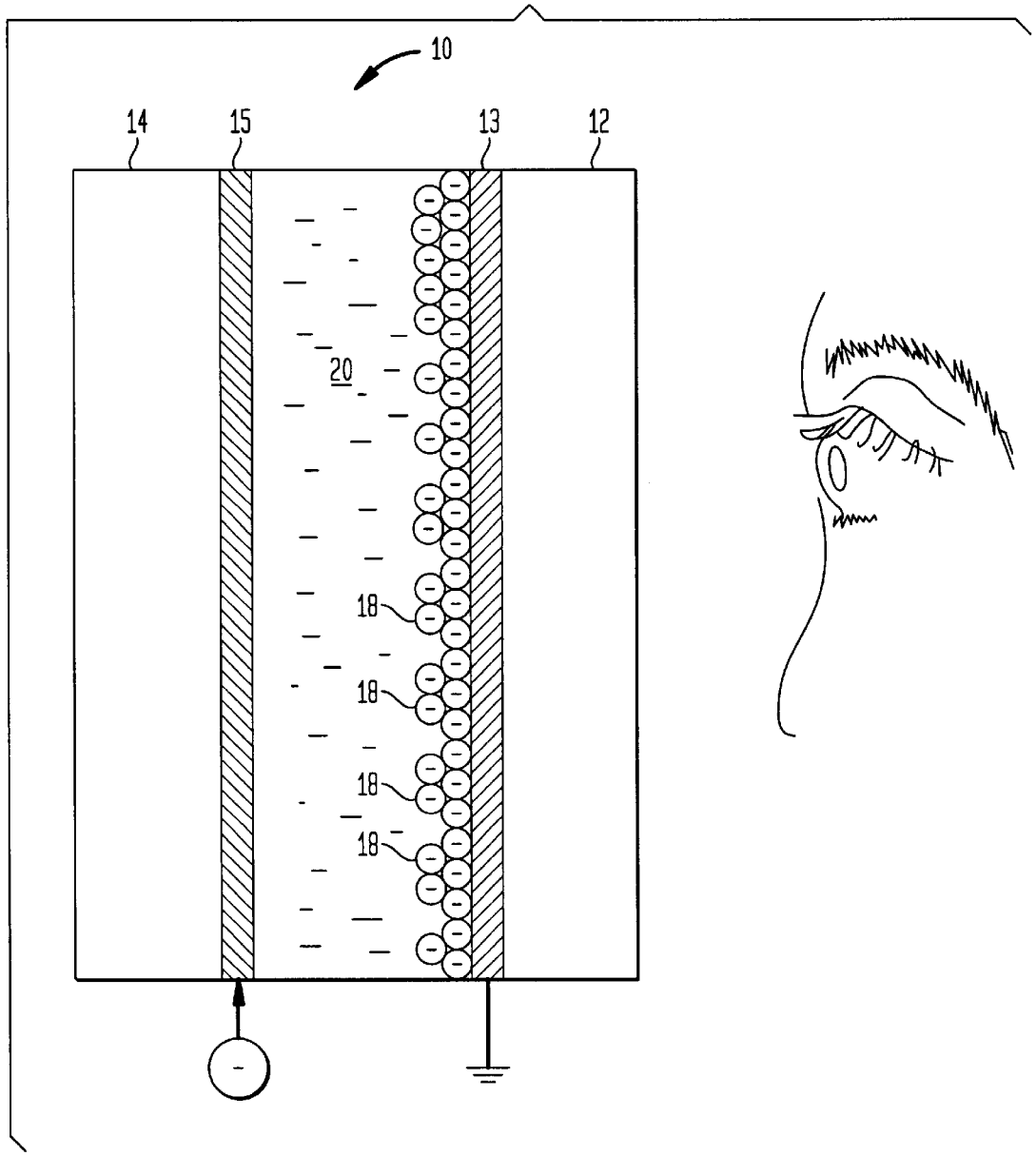

↓ BRING MOLD INTO CONTACT WITH LIQUID FILM, LIQUID WETS THE SURFACE OF THE MOLD

↓ SOLIDIFY THE LIQUID FILM BY EXPOSURE TO UV LIGHT THROUGH THE TRANSPARENT MOLD

↓ PEEL BACK THE FLEXIBLE MOLD

ETCH AWAY
THIN REGIONS OF
MOLDED FILMS

FILL WITH
SUSPENSION BOND
TOP ELECTRODE

OR

LIFTOFF MOLDED, ETCHED FILM, TRANSFER
TO ANOTHER SUBSTRATE COATED WITH
SUSPENSION, ADD TOP ELECTRODE

SUSPENSION
OF CHARGED
PARTICLES

SUSPENSION
OF CHARGED
PARTICLES

ELECTROPHORETIC DISPLAY AND METHOD OF MAKING THE SAME

FIELD OF THE INVENTION

The present invention relates to an electrophoretic display having improved stability and to a method of making the display using a micro-molding technique.

BACKGROUND OF THE INVENTION

An electrophoretic display essentially comprises a suspension of charged colored particles (typically white) in an optically dense liquid of another color. The suspension is maintained between two electrodes that define a sealed cell. It is "optically dense" in the sense that the suspension medium is sufficiently colored that one cannot see from one side of the cell to the other. When a potential difference exists between the electrodes, the particles are driven away from one of the electrodes towards the other electrode. When driven to the side of the cell nearest the viewer, the color of the particles will dominate the color of the display. Conversely, when the particles are driven to the far side, away from the viewer, the color of the liquid dominates the color of the display.

For example, an electrophoretic display device is illustrated in FIG. 1. This device comprises a sealed cell 10 formed with two closely-spaced plates 12, 14. At least one of the plates 12 defining the front of the device is glass or otherwise transparent. Electrodes are disposed on the plates, e.g., a first transparent electrode 13 is on the front glass plate 12 and a second electrode 15 is on the rear plate or substrate 14. At least one of the electrodes should be transparent, although they may both be transparent. The cell 10 holds an optically dense liquid 20 in which is suspended a plurality of charged particles 18, etc., which are shown as negatively charged. The particles may be a light color with the suspension medium 20 being a dark color, e.g., it typically is comprised of diarylide yellow pigment dispersed in a solvent such as tetrachloroethylene and xylene having a colored dye dissolved therein.

In operation, when a negative charge is applied to the rear electrode 15, the particles are driven toward the front electrode 13, such that the viewer will see the color of the particles through the front glass panel 12. However, with an opposite applied potential, the particles travel to the back of the cell and are obscured from view, such that the color of the liquid 20 determines the color of the cell. Color combinations of pigmented particles and the liquid may be used to achieve a desired color display, and a mixture of colored particles having different charges can be used with applied AC voltage to achieve color variations. Displays applying these principles are non-emissive, bistable (and hence power efficient), and can be fabricated at low cost, over large areas, and on flexible substrates. Such electrophoretic display devices and their properties are further described in A. Dalisa, "Electrophoretic Display Technology," IEEE Transactions on Electron Devices, Vol. ED-24, No. 7 (July 1977), at p. 827; I. Ota et al., "Electrophoretic Image Display (EPID) Panel," Proceedings of the IEEE, Vol. 61, No. 7 (July 1973), at p. 832; Fitzhenry-Ritz, "Optical Properties of Electrophoretic Image Displays," IEEE Transactions on Electron Devices, Vol. Ed-28, No. 6 (June 1981), at p. 726, which are incorporated herein by reference.

A drawback with these devices that has inhibited their commercialization is that their lifetimes are limited. Typically, the visible appearance of the display degrades after a few thousand hours. Pigment clustering and agglomeration are common modes of degradation. By "agglomeration," it is meant that the particles tend to become nonuniformly distributed in the plane of the display on length scales visible to the naked eye. This effect degrades the appearance and resolution of the display. LCDs and LEDs have been commercialized in preference to electrophoretic displays (EPDs). See, e.g., B. Comiskey et al., "An Electrophoretic Ink for All-Printed Reflective Electronic Displays," NATURE Vol. 394 (Jul. 16, 1998), at p. 253, reporting that while "microparticle-based displays have long intrigued researchers, . . . such displays have to date suffered from short lifetimes and difficulty in manufacture."

The difficulties with agglomeration are even more problematic in displays specially designed for achieving good image contrast. U.S. Pat. No. 5,872,552 issued Feb. 16, 1999, to Gorden et al., "Electrophoretic Display," assigned to IBM Corp. (incorporated herein), discloses a structure designed to achieve good image contrast by using an electrode at the side of the cell, a pedestal-shaped counter electrode within the cell, a front transmissive window, and optionally, a rear reflective surface. A difficulty with the Gordon configuration is that the counter electrode, being an electrically active component connected to the power supply, attracts the particles to a particular area of the cell and thereby increases the likelihood of agglomeration. See also U.S. Pat. No. 4,655,897 to DiSanto and U.S. Pat. No. 4,203,106 to Dalisa et al., both of which show rectangular-shaped electrodes that present the likelihood of agglomeration.

A number of techniques recently have been developed for achieving more stable EPDs but each has significant disadvantages. One approach, for example, involves encasing the charged particles and supporting liquid in substantially spherical polymeric "microcapsules." See, e.g., PCT patent application Ser. No. PCT/US98/04705, published Sep. 24, 1998, titled "Improved Microencapsulated Electrophoretic Display," and PCT patent application Ser. No. PCT/US97/18643, published May 7, 1998, titled "Nonemissive Displays and Piezoelectric Power Supplies Therefor," incorporated herein.

The microcapsules are closed microscopic vessels fabricated using coacervation, interfacial polymerization, or in-situ polymerization. The microcapsules do not entirely prevent agglomeration but they confine it within single capsules, which typically are too small to be seen by eye. Although this technique minimizes the adverse effects of agglomeration, it has disadvantages. For instance, fabrication of the microcapsules involves polymerization schemes carried out in the presence of the colored liquids and charged particles. Precise control must be exercised over the processing conditions such as the temperature, pH, and starting material concentrations, and it is difficult to control the size or uniformity of the microcapsules. These polymerization schemes place limits on the materials that may be used for the device and require additional fabrication steps. The starting materials, any intermediates, and of course, the end products need to be chemically compatible with the rest of the device, e.g., the materials used for the pigment particles and suspension medium, as the fabrication is performed in-situ.

Another approach for addressing agglomeration involves placing a charge on the pigment particles. For example, U.S. Pat. No. 5,403,518, "Formulations for Improved Electrophoretic Display Suspensions and Related Methods," issued Apr. 4, 1995 to Schubert and assigned to Copytele Inc., uses a charge control agent adsorbed on the pigment particles for preventing agglomeration. U.S. Pat. No. 4,680,103, issued Jul. 14, 1987 to Beilen, "Positive Particles in Electrophoretic Display Device Composition," describes attaching an organosilane to each of the particles where the organosilane includes a positively charged ionic functional moiety covalently bonded therein.

Other approaches involve using pulsed and DC voltages to periodically redistribute the particles or use of "electrostatic compartments" to restrict particle movement to a defined region. These approaches, if effective, require significant increases in the complexity of the electrodes and drive circuitry. S. Beilin et al., "2000 Character Electrophoretic Display," SOCIETY OF INFORMATION DISPLAY 86 Digest (1986), at p. 136. However, these approaches have never been demonstrated to be sufficiently effective for commercial devices with long lifetime.

As may be appreciated, techniques for improving the performance and lifetimes of EPDs are desired. The feasibility of commercializing EPDs depends on the development of effective approaches for eliminating agglomeration.

SUMMARY OF THE INVENTION

The applicants have discovered a configuration for an electrophoretic display device that is effective in substantially preventing agglomeration of the pigment particles. With this configuration, a suspension medium is contained between first and second electrodes to define a cell; a plurality of pigment particles are dispersed in the suspension medium; and a plurality of mechanical members project in the suspension medium. The members advantageously are sized sufficiently small that a plurality of members can exist within a minimally visible region of the cell, and they are configured (e.g., depending on size and materials), to have no adverse impact on the appearance of the display. The mechanical members may be fabricated separately from the remaining parts of the display, allowing for flexibility in the fabrication materials and processing conditions.

BRIEF DESCRIPTION OF THE DRAWINGS

For a better understanding of the invention, an exemplary embodiment is described below, considered together with the accompanying drawings, in which:

FIG. 1 is a schematic illustration of a prior art electrophoretic display device;

It is to be understood that these drawings are for the purposes of illustrating the concepts of the invention and are not to scale.

DETAILED DESCRIPTION OF THE INVENTION

With this invention, small-scale mechanical members are used to prevent non-uniformities among the charged particles, e.g., from agglomeration. These members are constructed to break apart any agglomeration as the particles travel from one side of the cell to the other. The members are not necessarily electrically active components, but their shape, distribution, and placement within the cell reverse the effects of agglomeration during operation of the display. In addition to reversing agglomeration, these mechanical members can act to frustrate segregation before large agglomerates can form. In other words, the mechanical members function to reduce agglomeration in at least two ways, i.e., they break up agglomeration that already has formed, and depending on how the members are designed, they can prevent formation of agglomerates by frustrating the lateral flow of particles within the plane of the display.

Advantageously, the members are sized sufficiently small that a plurality of members can exist within a minimally visible region of the cell, i.e., they exist within a region that is just large enough to be visible. In other words, the minimally visible region is the smallest spot that can be seen by the naked eye when a viewer looks at the display. Typically, this region will be about 50 $\mu$m square. The display may have a "front panel" or other face surface through which the cell will be viewed, and the minimally visible region as used herein is determined based on what can be seen when the cell is viewed from this face surface. For example, when the members are rectangular in shape and disposed perpendicular to the face surface, the members may have a width in the range of about 10 to 30 $\mu$m and a longer length but they should not have width dimensions on the order of a millimeter. The size, shape and materials used to configure the members should be selected so that they will have no adverse impact on the appearance of the display. The members may be fabricated with transparent materials, with materials having the same color as the suspension medium, or they may be placed sufficiently deep within the suspension medium (e.g., away from the face surface) that they are not visible to the naked eye. The size of the members may be adjusted depending on the location of and materials used for the members. The mechanical members are configured to reduce agglomeration by preventing agglomeration on scales visible to the naked eye or breaking-up particles that have become segregated (e.g., agglomerated) during operation.

Figure 2A:
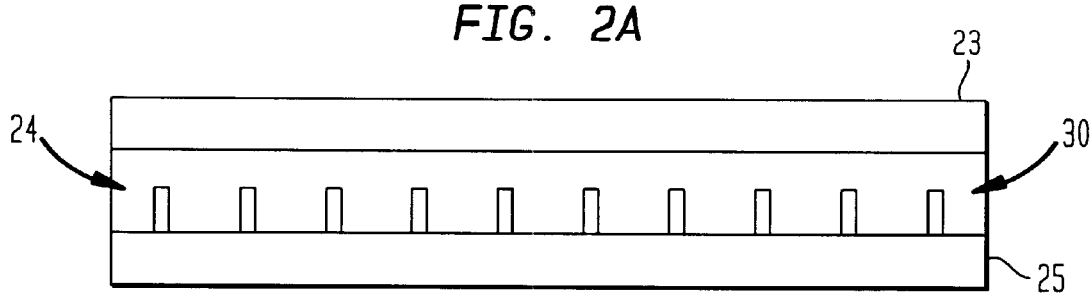
FIGS. 2A–2D schematically illustrate exemplary alternative embodiments of the electrophoretic display device.

Referring to FIGS. 2A–2D, exemplary alternative embodiments of the electrophoretic display device having the mechanical members are shown. In FIG. 2A, the EPD comprises a first electrode 23 and a second electrode 25 with a sealed chamber 30 defined therebetween for containing the charged particles and suspension liquid (not shown). A face plate and rear plate or substrate also may be placed adjacent the electrodes, as in FIG. 1. A plurality of substantially rectangular mechanical members 24 protrude from the second electrode into the chamber. The members may take other shapes as well, such as triangular, needle-shaped, conical, frustroconical, pyramidic, and so forth, the important consideration being that the member be sized to effectively break up agglomerated particles during operation of the display without significantly impeding the flow of the particles from one side of the cell to the other. Thus, a flat, broadened member would not be advantageous. A rectangular member with a high aspect ratio is advantageous. The members may be fabricated with any material compatible with the active components of the display. Exemplary materials preferred for fabricating the members include silicon dioxide, epoxy, polyurethane, or other materials that are substantially transparent to visible light. Since the members operate by mechanical forces to break up agglomerates of particles or prevent the formation of agglomerates, they do not require use of conductive materials and may comprise insulators.

Figure 2B:
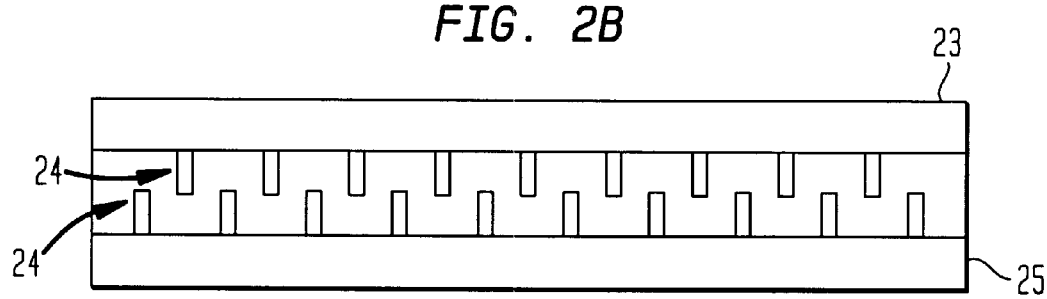
Figure 2C:
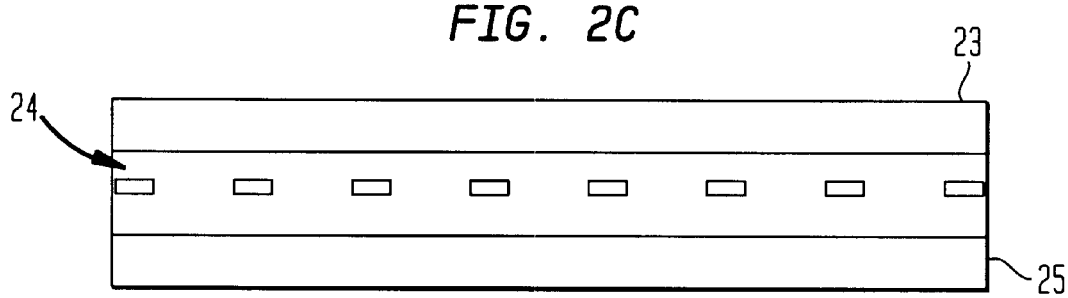
Figure 2D:
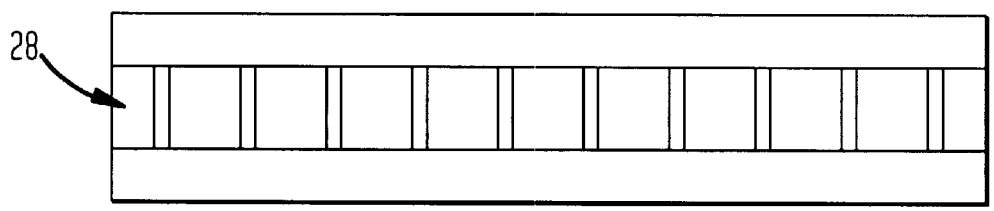

In FIG. 2B, the members 24 are disposed on both the first and second electrodes. The members also may be disposed on support structures for either the first and second electrodes (not shown). In FIG. 2C, the members 24 are laterally disposed along the length of the first and second electrodes with spaces between them such that the members define a suspended mesh. In FIG. 2D, the members 24 vertically interconnect the first and second electrodes to define enclosed cells 28.

The mechanical members are relatively easy to fabricate, e.g., as compared with polymerized microcapsules, and they can be formed directly on a wide variety of substrates, including flexible plastic substrates. The members can be fabricated separately from the suspension medium and particles, providing for considerable more flexibility as compared with a microcapsule configuration. With this invention, there is no need for concern about chemical compatibility between the mechanical members and the materials used in fabricating the displays. The processing parameters for the members need not be closely controlled to avoid degradation of other display parts, as the members may be separately processed. The mechanical members may be fabricated with a high degree of uniformity applying known techniques for depositing patterned layers, such as photolithography, electron-beam lithography, laser direct writing, two and multi-photon patterning, ink jet printing, microcontact printing, screen printing, embossing with rigid masters, and other methods known to those skilled in the field. An exemplary molding technique for fabricating the mechanical members and resultant EPD device is described below with reference to FIGS. 3A–3D.

Figure 3A:
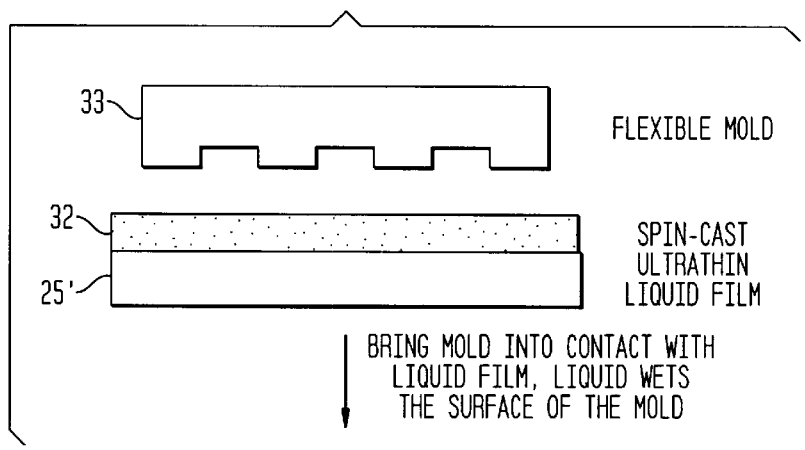
FIGS. 3A–3D schematically illustrate preliminary steps of a method for making the electrophoretic display device.

Referring to FIG. 3A, a first step involves providing a mold 33 which will define contours for the mechanical members. The mold is preferably flexible and may be formed by curing a liquid polymer on a patterned silicon wafer and then removing the cured polymer. An advantageous method for preparing the mold involves generating a pattern of photoresist on a silicon wafer using conventional high resolution photolithography. Test patterns of about 10 $\mu$m in thickness fabricated with STR-1075™ available from Shipley, Inc., are suitable, for example. A non-stick layer may be deposited on the wafer before deposition of the prepolymer. For example, the patterned wafer may be exposed to a vapor of tridecafluoro-1,1,2,2-tetrahydrooctyl-1-trichlorosilane, which forms a non-stick silane monolayer on the native oxide on the silicon. The liquid prepolymer may be cast on the silane monolayer. A suitable material for the prepolymer comprises polydimethylsiloxane (PDMS). PDMS is available from Dow Chemical Company (Dow) under the tradename SYLGARD 184.™ The prepolymer may then be cured. When PDMS is used, a suitable curing step involves heating to about 65° C. for about two hours. The solid PDMS is then removed from the wafer to provide the flexible mold 33. Advantageously, the mold is fabricated with a transparent material so that the material forming the mechanical members can be cured by applying UV light through the mold, as further described below.

In FIG. 3A, a first step of fabricating the mechanical members with the mold is shown. An ultrathin liquid film 32 is spin-cast on a substrate 25'. By ultrathin is meant that the film has a thickness of about 20–40 $\mu$m, more preferably about 30 $\mu$m. The substrate 25' may be flat or structured. It may serve as the bottom electrode of the electrophoretic display device. The liquid advantageously may comprise a photocurable polymer such as an epoxy. A suitable epoxy is available from Dow under the tradename DEN 431. To assist in spin casting a thin layer on the substrate, the epoxy may be diluted with solvent. For example, epoxy novolac may be mixed with a small amount of an acrylate photosensitizer (~3% by weight), and diluted at a ratio of about 2:1 by weight with propylene glycol monomethyl ether acetate (PGMEA) (2 parts epoxy to 1 part PGMEA). The resulting liquid may be spin cast onto the silicon wafer substrate 25', and speeds of about 1000 rpm for about 40 seconds produce an ultrathin liquid film. The PGMEA is sufficiently volatile that it evaporates during spinning.

Figure 3B:
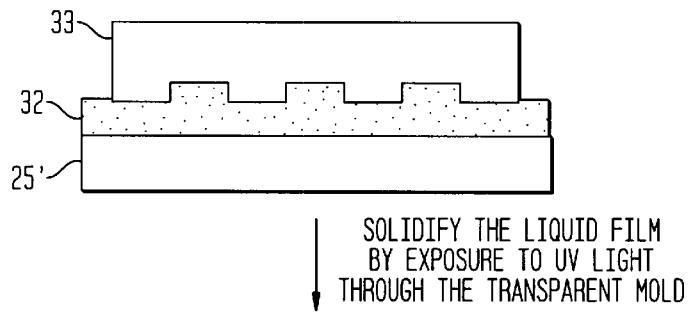

Referring to FIG. 3B, the mold 33 is then brought into contact with the liquid film 32. The flexibility of the mold may be exploited to avoid the formation of air bubbles. For example, the surface of the mold may be gradually placed over the liquid film 32, e.g., as by first placing only the center of the mold in contact with the liquid film and then gradually allowing the surface of the mold to contact the film out to its edges, or by first placing one edge of the mold in contact with the film and then gradually proceeding to deposit the mold across the surface of the wafer.

Figure 3C:
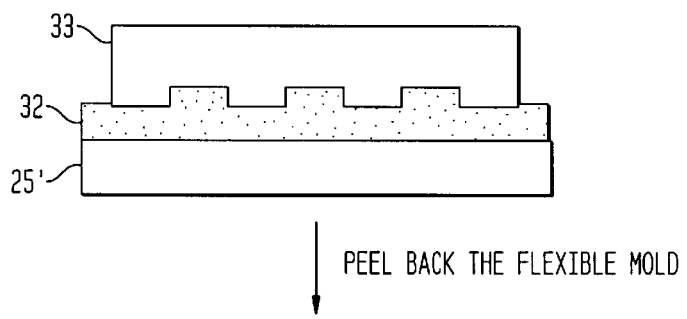

Referring to FIG. 3C, with the mold 33 in place, the liquid film is solidified. This may be achieved by exposing the film 32 to ultraviolet light. When a mold having a thickness of about 1 cm is placed over a film having a thickness of about 20 $\mu$m, a high power mercury lamp applied at about 4000 $\mu$W/cm$^2$ for about 45 minutes works to cure the film. The mold then may be removed to provide the structure of FIG. 3D. A flexible mold is advantageous again in the removal step in that it may be removed by peeling from the cured polymer film 32.

Figure 3D:
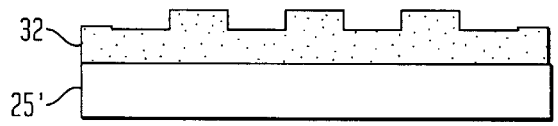
Figure 4A:
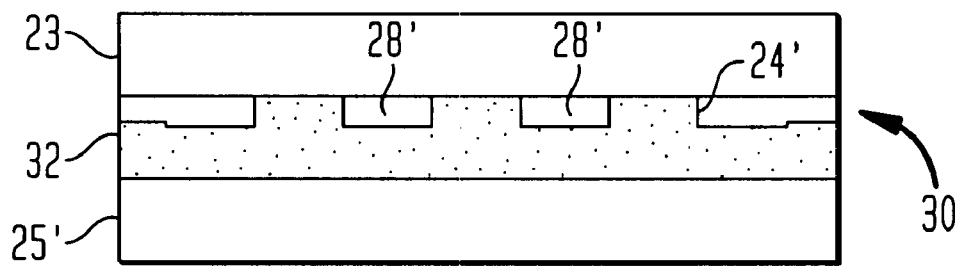
FIGS. 4A–4B illustrate exemplary processing steps subsequent to the steps of FIGS. 3A–3D.
Figure 4B:
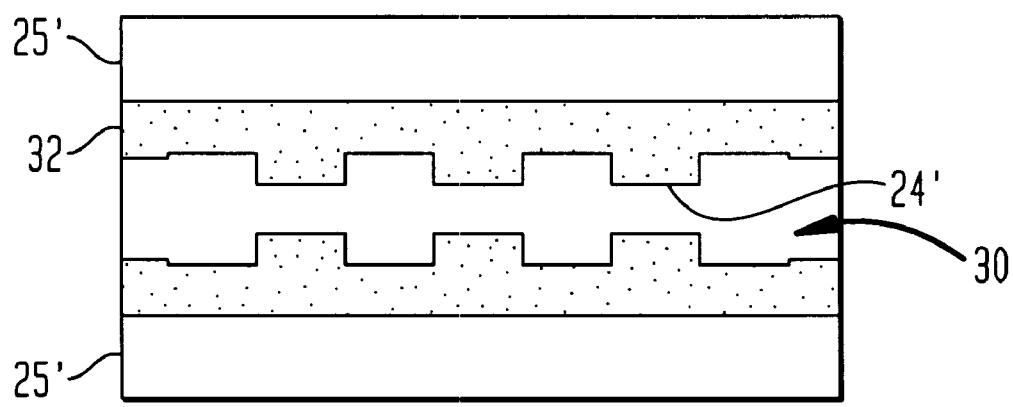

Once the molded film on the substrate is provided, as in FIG. 3D, various alternative approaches may be used to fabricate the electrophoretic display device. For example, a top electrode 23 may be secured to the patterned film as in FIG. 4A. The contours 24' of the molded film define the mechanical members, and between the members cells 28' may be formed within the device. The contours 24' need not be in contact with the top electrode 23, so that liquid may flow between the cells 28', although it is also possible for the cells 28' to encapsulate the particles therein. As can be seen, there is flexibility in the fabrication of the members, and precise controls over their alignment are not required. Alternatively, two structures having the molded film and substrate may be aligned facing each other, as in FIG. 4B. In any case, the gap 30 between the electrodes may be filled by capillary action with a liquid suspension medium suitable for an electrophoretic display, e.g., containing pigment particles, and then the edges of the display may be sealed to prevent leakage of the liquid and form the sealed chamber 30. Materials suitable for the various parts of the device including the suspension medium, pigment particles, and sealed edges are known in the field and described in the various references, identified above, and in PCT patent application Ser. No. PCt/US98/17734 to E-Ink Corp., titled "Electrophoretic Displays and Materials," published Mar. 4, 1999, incorporated herein by reference.

Figure 5A:
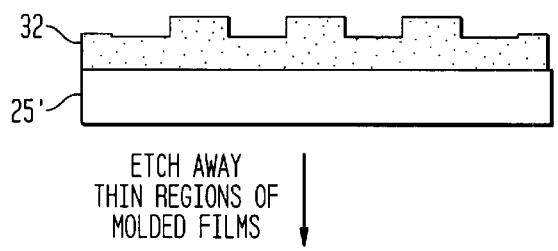
FIGS. 5A–5D illustrate alternative exemplary processing steps subsequent to the steps of FIGS. 3A–3D.
Figure 5B:
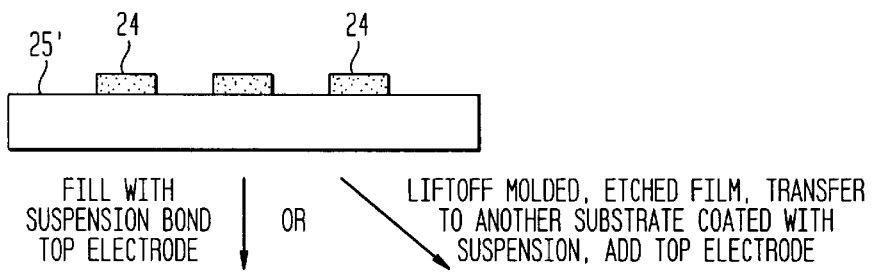
Figure 5C:
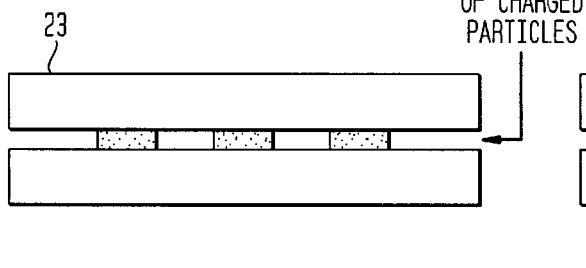
Figure 5D:
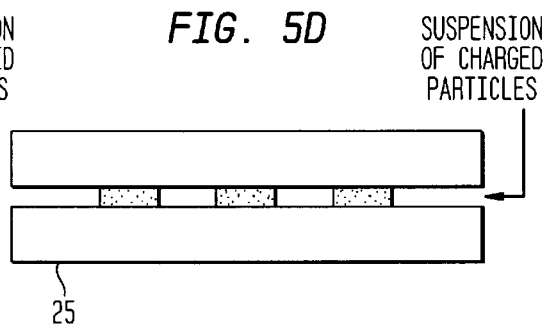

In FIGS. 5A–5D, alternative processing steps subsequent to the formation of the molded film/substrate structure of FIG. 3D are shown. In FIGS. 5A–5B, the thin regions of the molded film are etched away to provide separate mechanical members 24. In FIG. 5C, the cavities between the members may be filled with suspension medium, a top electrode 23 may be bonded thereon, a suspension of charged particles may be injected between the electrodes, and the gap sealed to prevent the leakage of fluid. Alternatively, where the substrate 25' used to fabricate the molded film 32 and etched members 24 (FIG. 5B), is made of a material other than that desired for the bottom electrode, the etched film may be removed from the substrate 25', and transferred to an electrode/substrate 25, as in FIG. 5D. The etched film 24 on the bottom electrode/substrate 25 (FIG. 5D), may be coated with a suspension medium, and then a top electrode 23 added and the edges sealed to complete the electrophoretic display device.

It is understood that the embodiments described herein are merely exemplary and that a person skilled in the art may make variations and modifications without departing from the spirit and scope of the invention. All such variations and modifications are intended to be included within the scope of the appended claims.

We claim:

1. An electrophoretic display device having a face surface for viewing a display cell therethrough comprising:

first and second electrodes;

a suspended medium contained between the first and second electrodes to define a display cell;

a plurality of pigment particles dispersed in the suspension medium; and a plurality of mechanical members disposed in the suspension medium for reducing agglomeration of the pigment particles, the members disposed within the cell at a sufficient distance from the face surface that they are obscured from view by the suspension medium.

2. The device of claim 1 in which the mechanical members are fabricated with a material substantially transparent to visible light.

3. The device of claim 2 in which the material is selected from silicon dioxide, epoxy, and polyurethane.

4. The device of claim 1 in which the mechanical members are fabricated to have substantially the same color as the suspension medium.

5. The device of claim 1 in which the mechanical members are substantially rectangular in shape.

6. The device of claim 1 in which the mechanical members are aligned along a plane substantially parallel with the electrodes to define a mesh suspended between the first and second electrodes.

7. The device of claim 1 in which each of the mechanical members is aligned along a plane substantially perpendicular to the electrodes.

8. The device of claim 1 in which each one of the mechanical members has two ends and is attached at one of the two ends to one of the first and second electrodes or a support to one of the first and second electrodes.

9. The device of claim 1 in which each one of the mechanical members has two ends and is attached at one of the two ends to the first electrode and at the other of the two ends to the second electrode to vertically interconnect the first and second electrodes.

10. The device of claim 1 in which a plurality of the mechanical members exist within a 50 micrometer square region of the display cell.

* * * * *